United States Patent [19]

Frank et al.

[11] Patent Number: 4,526,605
[45] Date of Patent: Jul. 2, 1985

[54] VACUUM MOLD FOR SHAPING GLASS SHEETS

[75] Inventors: Robert G. Frank, Murrysville; Michael T. Fecik, Pittsburgh; John J. Ewing, Tarentum, all of Pa.

[73] Assignee: PPG Industries, Inc., Pittsburgh, Pa.

[21] Appl. No.: 532,422

[22] Filed: Sep. 15, 1983

[51] Int. Cl.³ .................................... C03B 23/035
[52] U.S. Cl. ..................... 65/273; 65/104; 65/106; 65/287
[58] Field of Search ............... 65/104, 106, 107, 287, 65/273

[56] References Cited

U.S. PATENT DOCUMENTS

| | | | |
|---|---|---|---|
| 3,607,187 | 9/1971 | McMaster | 65/106 |
| 3,607,200 | 9/1971 | McMaster | 65/182 A |
| 3,634,059 | 1/1972 | Miller | 65/287 X |
| 3,728,098 | 4/1973 | Giffen | 65/361 |
| 4,204,853 | 5/1980 | Seymour | 65/273 X |
| 4,260,408 | 4/1981 | Reese et al. | 65/106 |
| 4,282,026 | 8/1981 | McMaster et al. | 65/273 |
| 4,285,715 | 8/1981 | Frank | 65/106 |

*Primary Examiner*—Arthur Kellogg
*Attorney, Agent, or Firm*—Andrew C. Siminerio; Edward I. Mates

[57] ABSTRACT

In apparatus for shaping sheets of heat-softenable material, such as glass and plastics, an upper vacuum mold is provided with an apertured wall member of low expansion refractory material to engage a heat-softened sheet during a portion of its shaping. In order to improve its durability, metal clamping devices that cause high local stresses in the refractory wall member are not used to secure the refractory wall member to metal structural elements of the vacuum mold. The present invention comprises novel mold structure to support a lower apertured wall member of refractory material on an inverted metal box member without metal attachment devices that induce high local stresses.

11 Claims, 3 Drawing Figures

VACUUM MOLD FOR SHAPING GLASS SHEETS

BACKGROUND OF THE INVENTION

The present invention relates to a method and apparatus for shaping glass sheets and particularly those that are shaped by a method involving conveying glass sheets into a shaping station where the glass sheet is delivered at its deformation temperature. The glass sheet is supported between upper and lower shaping molds, the upper one of which being provided with an apertured wall through which suction can be applied to hold the glass sheet in pressurized engagement thereagainst. While the glass sheet is held by suction, a ring-like member is conveyed into the shaping station between the upper and lower molds and the glass sheet is transferred onto the ring-like member that supports the glass sheet for movement through a cooling station where tempering medium, most usually in the form of pressurized blasts of air, is imparted against the opposite surfaces of the glass sheet at a rate sufficient to cool the heated shaped glass sheet and impart at least a partial temper thereto.

In the past, the vacuum molds that supported the glass sheets were either made of a very heavy refractory material or of metal. The lower surface of the vacuum molds, if made of metal, were covered with covers of a flexible refractory material, such as fiber glass cloth and the like, to avoid direct contact between the glass sheet and the bottom surface of the apertured lower wall of the upper mold. Such direct contact would replicate scratches and other defects in the lower mold surface, which would harm the optical properties or deform the glass sheet from the shape desired to be imparted by the upper vacuum mold in the absence of any cover material.

If the upper vacuum mold were made of metal, and the mass production of bent glass sheets was conducted at a rapid rate, the shape of the apertured bottom wall of the upper vacuum mold tended to become distorted. This distorted shape was imparted to the glass sheet. Consequently, bent glass sheets did not conform to the shape desired by the customer. Customer tolerances are quite strict, particularly in the need to apply shaped glass sheets to a frame having a shape desired by automobile stylists so that the shaped glass window forms a continuation of the design of the automobile which includes the curved frame within which the shaped glass window is mounted.

Since the automotive industry has been required in recent years to develop automobiles that reduce their fuel consumption, it has become necessary to bend and temper thinner glass sheets than those found suitable in the past. The present invention relates to the treatment of relatively thin glass sheets, particularly those having a nominal thickness of ⅛ inch (3.2 millimeters) or less. Thinner glass sheets sag more readily than thicker glass sheets at any given elevated temperature above the glass deformation temperature. Hence, it is more difficult to control the shape imparted to thinner glass sheets, and in recent years the shaping of thinner glass sheets has incorporated the use of vacuum molds having lower apertured walls enclosing a chamber through which suction is applied to hold a heat-softened glass sheet by vacuum against the downwardly shaping surface of a shaping mold to control its sag during the shaping operation.

Shaped glass sheets are widely used as side windows or rear windows in vehicles such as automobiles or the like in positions where tempered glass sheets are permitted. To be suitable for such application, flat glass sheets must be shaped to precisely defined curvatures dictated by the shape and outline of the frames defining the window openings into which the glass side windows and rear windows are installed.

It is also important that the side windows meet stringent optical requirements. In addition, the windows must be free of optical defects that would interfere with the clear viewing therethrough, particularly in their viewing area.

During their fabrication, glass sheets intended for use as shaped windows in vehicles are subjected to thermal treatment to temper as well as to shape the glass sheets. Tempering increases the resistance of the shaped windows to damage resulting from impact. In addition to increasing the resistance of the glass sheet to breakage, tempering also limits any glass sheet fracture to relatively small, relatively smoothly surfaced fragments that are less injurious than the relatively large, jagged fragments that result from the more frequent breakage of untempered glass.

The commercial production of shaped glass sheets for such purposes commonly includes heating flat glass sheets to the softening point of the glass, shaping the heated sheets to a desired curvature and then cooling the bent sheets in a controlled manner to a temperature below the annealing range of the glass. During such treatment, a glass sheet is conveyed along a substantially horizontal path that extends through a tunnel-type furnace where the glass sheet is one of a series of sheets that are heated to the deformation temperature of glass and along an extension of the path into a shaping station where each glass sheet in turn is transferred onto a lifting mold that lifts the glass sheet into adjacency to a vacuum mold. Suction is applied to the vacuum mold to lift and hold the shaped glass sheet in pressurized engagement thereagainst. The lifting mold retracts to below the substantially horizontal path. At about the same time, a ring-like member having an outline shape conforming to that of the glass sheet slightly inboard of its perimeter moves upstream into a position below the upper vacuum mold and above the lower lifting mold. Release of the vacuum deposits the shaped glass sheet onto the ring-like member. The ring-like member conveys the glass sheet into a cooling station for rapid cooling.

In prior art apparatus, materials used for the vacuum molds were either metal or massive refractory materials. When the upper vacuum mold included a downward facing shaping wall of metal that was apertured, intermittent contact with the relatively hot glass sheets caused the downwardly facing wall to distort from the shape desired therefor. The use of flexible fabric materials of a refractory nature such as fiber glass cloth insulated the hot glass sheet from direct contact with the lower metal shaping surface of the upper vacuum mold. However, as mass production rates increased, it was found that the insulation properties of the fiber glass was insufficient to prevent distortion of the upper vacuum mold from its desired shape. As a consequence, the mold developed a distorted shape during the fabrication of approximately 100 shaped glass sheets.

Refractory lower walls were also used in vacuum molds in the prior art. In such constructions, low expansion refractory materials were not so prone to develop distortion in lower apertured walls, but the manner by which the lower refractory walls were supported by the rest of the vacuum mold structure caused structural weakness that led to frequent requirements for vacuum mold replacement.

It would be beneficial for the glass sheet bending art to develop a type of mold that could utilize suction for holding a glass sheet thereagainst in order to impart a more precise shape to the thinner glass sheets presently treated for the production of tempered side windows and rear windows of automobiles and other vehicles than those having metal lower walls that distorted in shape. It would also be beneficial for the glass sheet bending art to develop a vacuum mold of low expansion refractory material that is more durable than prior art vacuum molds of such composition.

DESCRIPTION OF PATENTS OF INTEREST

U.S. Pat. No. 3,607,187 to McMaster uses a vacuum mold to hold a heat-softened glass sheet thereagainst solely by vacuum. The walls of the mold are depicted in the drawings as being constructed of a refractory material, and the construction of the mold structure appears to be unitary. A heat-softened glass sheet is lifted into engagement against the vacuum mold solely by a vacuum applied through passages in a vacuum mold surface positioned adjacent the sheet as the sheet is formed to the vacuum mold surface. Such a mold is limited in practical use to shaping to a single shape and must be replaced entirely whenever a production change takes place.

U.S. Pat. No. 3,607,200 to McMaster shows a forming surface means against which a heat-softened glass sheet is lifted on an open ring mold to impress a shape onto the sheet before transferring the shaped sheet on the mold to a cooling station. The forming surface means may have a vacuum mold applied to suck the glass sheet thereagainst to provide a more closely conforming shape throughout the extent of the heat-softened glass sheet. In the preferred embodiment, the forming surface means comprises a mold. However, the exact construction of this mold is not disclosed.

U.S. Pat. No. 3,728,098 to Giffen discloses a foraminous metal mold member having a perforated ceramic coating of a thermal barrier material. The Giffen mold supports a charge of molton glass on an upwardly facing supporting surface and uses suction to conform the glass along the supporting surface. The forming surface of the mold comprises a foraminous or perforated ceramic coating of a thermal barrier material, the exact composition of which is not disclosed, bonded to metal. If the Giffen mold were oriented with its ceramic coating facing downward, it would require replacement of the entire mold structure to adjust the apparatus for a different production pattern.

U.S. Pat. No. 4,285,715 to Frank discloses a press bending apparatus in which a succession of glass sheets is treated by lifting each sheet by a slatted curved mold having a first curvature into close engagement with a vacuum-type mold having a downward facing surface of a slightly different curvature. The vacuum mold has suction applied to lift the glass into conformity throughout its extent and then the glass is dropped to conform to the shape of an outline mold which is moved between the lifting mold and the vacuum mold and transports the shaped sheet while supported adjacent its periphery during its transport through a cooling station where the shaped glass sheet is quenched sufficiently rapidly to develop an adequate temper. The lifting mold, the vacuum mold and the ring-like member are coordinated in their movements in such a way as to minimize the time needed for the glass sheet after its arrival at the shaping station to be transported between the lifting mold, the vacuum mold and the ring-like member. The vacuum mold in this apparatus is disclosed as being composed of metal covered with refractory material such as fiber glass, as is well known in the art. The gradual distortion of the metal bottom wall due to thermal expansion resulting from intermittent contact with hot glass at high production rates causes the glass sheets to gradually develop an undesired shape.

U.S. Pat. No. 4,282,026 to McMaster et al. discloses a vacuum mold used in glass sheet shaping apparatus. The vacuum mold of this patent has a lower portion that forms the bottom wall of the mold. Edge projections extend from both ends of the lower portion and are received within associated grooves in an upper portion so as to be secured thereto and to cooperate with the upper portion to define a vacuum cavity for the vacuum mold. Any attachment fixtures tend to wear the ceramic structure of the attached portions of the upper mold portion and the lower mold portion.

When the vacuum molds are made of metal, the molds tend to grow during the early stages of a mass production operation. The first 100 or so parts produced in a mass production operation are formed using an apertured vacuum mold whose size increases as the temperature of the metal mold wall increases during the operation. As a result, the shape of the vacuum mold is such that the first 100 shaped windows have shapes that vary from window to window. The size of the mold changes while approximately the first 100 parts are fabricated. Then, the mold assumes a shape different from its original shape when the production started. Usually, after such initial production at mass production rates, the shape of the apertured metal wall stabilizes and the vacuum mold produces parts having essentially the same shape for the remainder of a production run of a particular pattern. It would be beneficial for the glass sheet shaping art to develop a vacuum mold with an apertured wall that does not change its shape in the manner of shaped metal walls so that the first shaped window produced would be as acceptable to the customer as the shaped windows produced after the break-in run of approximately 100 parts.

When the vacuum molds are made essentially completely of ceramic material, the distortion problem is remedied. However, metal attachment means to secure the ceramic mold portions to other mold elements to form a vacuum chamber for the mold applied local stresses that caused damage to the vacuum mold, thereby causing frequent replacement of the bottom ceramic wall. It would be beneficial for the glass sheet bending art to develop a vacuum mold that retains its shape as well as those of the prior art that had bottom apertured walls composed of low expansion refractory material and had the durability of vacuum molds composed of metal.

SUMMARY OF THE INVENTION

The present invention comprises an upper vacuum mold composed of an upper inverted metal box member having vertical walls provided with thick, transversely inwardly extending circumferential ledges at their lower end. The ledges extend inwardly to form sliding supports for corresponding outwardly extending ledge portions of a lower vacuum mold portion of ceramic composition. At least one of the vertical walls of the inverted box member is readily removable to provide an access to a vacuum chamber between the inverted metal box and the lower vacuum mold portion to enable the latter to be removed by sliding and be capable of ready replacement.

The novel vacuum mold structure of the present invention uses the ledges of the inverted metal box to support an overlapping portion of outwardly extending ledge portions of the lower vacuum mold portion in such a manner that the thermal expansion of the metal box does not affect the shape of the shaped, apertured wall. The mold portions are provided with overlapping ledge portions of sufficient width to provide gravity support of the ledge portions that extend outwardly of the shaped apertured wall by the corresponding ledges that extend inwardly of the inverted metal box without requiring any drilling and/or clamping of the relatively fragile refractory member comprising the downwardly facing, shaped apertured wall.

These and other features and benefits of the present invention will be understood much better in the light of a description of a specific embodiment of the invention which follows.

DESCRIPTION OF THE DRAWINGS

In the drawings that form part of a description of a preferred embodiment of this invention.

DESCRIPTION OF THE PREFERRED EMBODIMENT

Figure 1:
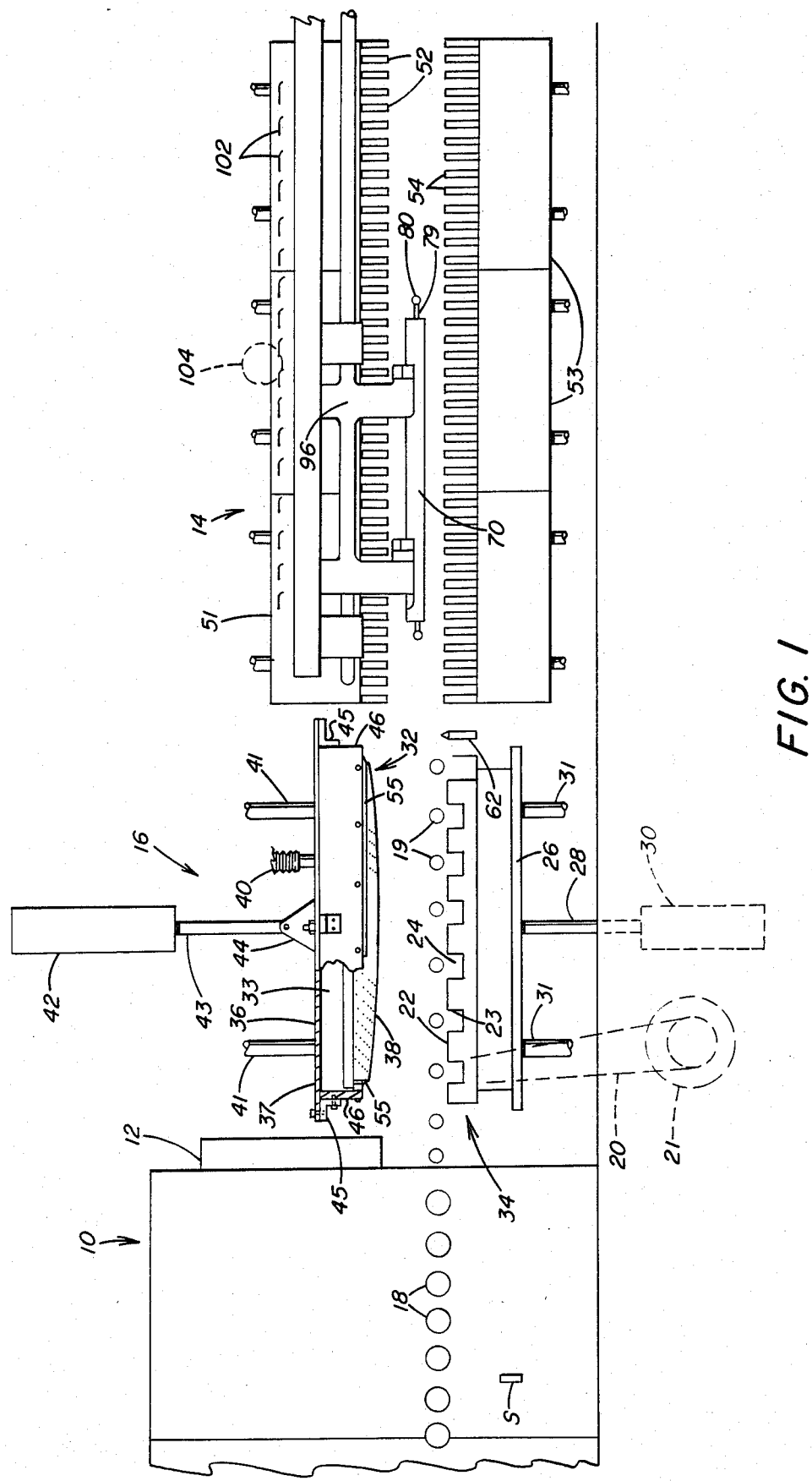
FIG. 1 is a fragmentary longitudinal view of a portion of a glass sheet shaping station which includes a vacuum mold conforming to the present invention shown in close adjacency to an exit end of a heating furnace and an entrance end of a cooling station, with certain features removed in part to show other parts.

Referring to the drawings, an apparatus for heating and shaping sheets of material, such as glass, includes a heating means including a tunnel-type furnace 10 having a vertically movable exit door 12 through which sheets of glass are conveyed from a loading station (not shown) while being heated to the glass deformation temperature. A cooling station generally indicated at 14 for cooling the curved sheets of glass and an unloading station (not shown) beyond the cooling station 14 are located in end-to-end relation to the right of the furnace 12. An intermediate or shaping station 16 is disposed between the furnace 12 and the cooling station 14. A transfer means (not shown) located in the cooling station 14 transfers the shaped and tempered glass sheet to a downstream conveyor (not shown) for transport to the unloading station. A preferred transfer means for bent, tempered glass sheets is disclosed in U.S. Pat. No. 4,368,065 to Frank, the disclosure of which is incorporated herein by reference.

Heat may be supplied in the furnace 12 by hot gases from gas burners or by electrical radiant heaters or by a combination of both, which heat supply means are well known in the art. The apparatus includes a horizontal conveyor comprising longitudinally spaced, transversely extending conveyor rolls 18 that define a path of travel which extends through the furnace 12 and additional smaller diameter conveyor rolls 19 that define an extension of said path into the shaping station 16. The rolls of the conveyor are arranged in sections and their rotational speed controlled through clutches (not shown), and one or more drive chains 20, each coupled to a drive motor 21 so that the speed of the different conveyor sections may be controlled and synchronized in a manner well known in the art. A glass sensing element S is located before the exit door 12 to initiate a cycle of operation of this apparatus.

A timer circuit is provided to synchronize the operation of various elements of the apparatus according to a predetermined sequence. The glass sensing element S and the timer circuit actuated thereby cooperate to provide synchronizing means for the apparatus of the present specification in a manner well known in this art.

The shaping station 16 comprises an upper vacuum mold 32 enclosing a vacuum chamber 33 and a lower mold 34. The upper mold 32 may be covered by a flexible fabric cover 35 of a refractory material, such as fiber glass, that does not harm heat-softened glass on pressurized engagement therewith. The lower mold comprises an upper surface 22 conforming in elevational shape to a first shape desired for a glass sheet to be bent. The upper surface 22 is located at the upper ends of transversely extending lands 23 extending completely across the transverse dimension of the lower mold 34. The lands are spaced by transversely extending grooves 24 which extend across the entire transverse dimension of the lower mold 34 to provide clearance for raising and lowering the lower mold 34 between a recessed position below the conveyor rolls 19, and an upper position above the level of said latter conveyor rolls. The lower mold 34 is fixed to a lower mold support plate 26 and is preferably limited in its upward movement toward the upper vacuum mold 32 to a closest spacing therebetween slightly greater than the glass sheet thickness, preferably no less than approximately twice the glass sheet thickness. However, this limitation is not absolutely necessary because one of the features of the present invention allows a lower shaping wall member of the vacuum mold 32 to rest its mass on a pheripheral ledge extending inward of an upper inverted metal box member thereof in a manner to be described later. This manner of support makes it unnecessary to use metal clamping means on the refractory lower shaping wall member. Avoidance of metal clamping means avoids large localized stresses in the refractory wall member that is apt to result in breakage and require replacement of the refractory wall member.

Since automobile side windows have a fairly constant radius of curvature about a horizontal axis in order to facilitate their raising and lowering in an automobile body between an open and a closed position, many different patterns in a family of patterns have different outline shapes but are bent to the same radius of curvature. Therefore, it is desirable to have one lower mold capable of producing each family of patterns. It has been found that a lower shaping mold of a given radius of curvature having longer dimensions than a family of side windows of said given radius of curvature but of different outline shapes and/or different dimensions can fabricate curved side windows of said family of different sizes but of said given radius of curvature. In the apparatus of this specification, one lower shaping mold can be installed in conjunction with an upper vacuum mold of slightly different curvature to produce any pattern of a family of patterns having a given radius of curvature but of different sizes and/or outline shapes without requiring any removal or replacement of the lower mold and/or of the upper vacuum mold.

The upper surface 22 of the lower mold 34 is preferably smoothly surfaced to avoid imparting any irregularity in the supported glass sheet surface, is composed of a material that does not react with glass, is easily shaped to the smoothly surfaced contour desired and has good durability despite intermittent contact with hot glass that causes rapid cyclical temperature variations over an extended period. A good material for the grooved lower shaping mold 34 is an alumino-silica cement sold by Johns-Manville under the trademark of TRANSITE ®. If desired, the upper surface 22 of the lands 23 of the lower mold may be covered with a flexible fabric cover (not shown) of a refractory material, such as fiber glass, that does not harm heat-softened glass on pressurized engagement therewith. Such covering is preferably in the form of strips, one strip being applied to each land.

Raising and lowering means in the form of one or more lower piston rods 28, each movably mounted to a rigidly supported piston cylinder 30, raises and lowers support plate 26 and its attached lower shaping mold 34 a limited distance. Alignment posts 31 are attached to mold support plate 26 to move the lower mold 34 vertically. The alignment posts 31 move vertically through alignment sleeves (not shown) mounted to a supporting framework (not shown) for the shaping apparatus in a manner well known in the art.

The upper vacuum mold 32 comprises an inverted metal box 36 having an upper metal wall member 37, and a lower refractory wall member 38 that is apertured. The lower wall member is provided with an outwardly extending ledge portion 39 that is about 1 inch (2.54 centimeters) thick and about ¾ inch (1.9 centimeters) wide. The lower wall member 38 may have its downwardly facing surface shaped to be less sharply bent than the shaping surface formed by the upper surface 22 of the lower mold 34.

The upper vacuum mold 32 forms the chamber 33, between the upper metal wall member 37 and the lower wall member 38, that communicates with a source of vacuum (not shown) through an evacuation pipe 40 and a suitable valve (not shown). The upper vacuum mold 32 is suitably connected through upper vertical guide rods 41 to an upper supporting frame (not shown) which supports an upper vertical piston 42 and is movable relative to the upper supporting frame by an upper vertical piston rod 43 mounted in piston 42 and a clevis connection 44 to the upper wall member 37. The evacuation pipe 40 may be selectively connected through a suitable valve arrangement to a source of pressurized air (not shown) and the valves for the vacuum line and for the pressure line may be synchronized according to a predetermined time cycle in a manner well known in the art to effect a vacuum in chamber 33 when the upper mold 32 engages a glass sheet and to promote superatmospheric pressure in chamber 33 in order to assist release of the glass sheet from engagement against the upper vacuum mold 32. As an alternative, the upper wall member 37 may be apertured to receive a pressure feed pipe connected via suitable valving to a pressurized air source independently of evacuation pipe 40.

A plurality of angle irons 45 is spaced along the longitudinal and transverse side edges of the upper metal wall member 37. Each angle iron has a horizontal flange fixed to the upper metal wall member 37 and a vertical flange attached to internally threaded, essentially vertical metal wall portions 46 by bolts 47. The upper metal wall member 37 cooperates with the vertical metal wall portions 46 to form the inverted metal box 36.

Figure 2:
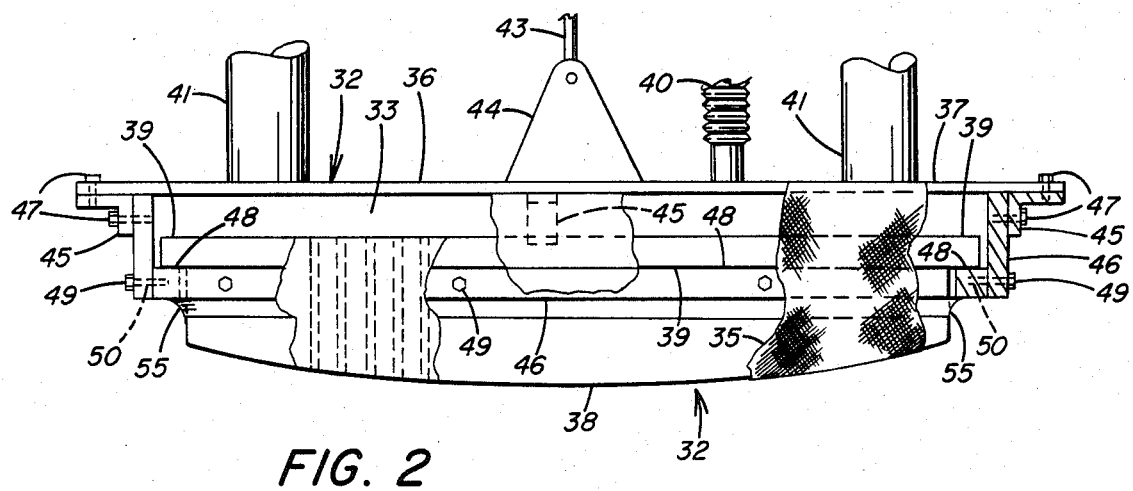
FIG. 2 is a longitudinal elevational view of the vacuum mold forming part of the present invention, partly in section, with certain parts, such as a mold cover and certain structural elements of the vacuum mold, removed in part to facilitate the showing of other elements of the present invention more clearly.
Figure 3:
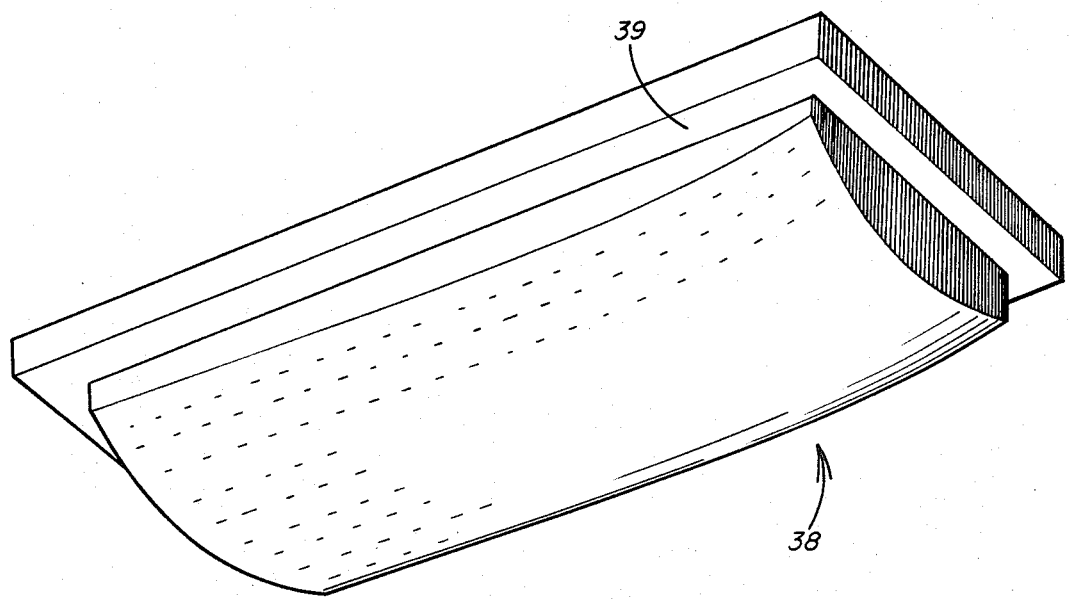
FIG. 3 is a perspective view of a downwardly facing, shaped, apertured wall member of a vacuum mold showing its relation to its ledge portions.

A circumferentially extending ledge 48 having longitudinally extending side ledge portions interconnected by transversely extending end ledge portions, extends inward from the wall portions 46. Preferably the ledge is composed of abutting metal bars 1 inch (2.54 centimeters) square in cross section to provide a rigid supporting surface for the ledge portion 39 of lower refractory wall member 38 that overlaps it. In this manner, additional bolts 49 secure the circumferential ledge 48 to the vertical wall portions 46 through internally threaded recesses 50 (FIG. 2) in the wall portions 46. The peripheral ledge 48 is constructed and arranged to provide an inwardly extending support 1 inch (2.5 centimeters) wide and 1 inch (2.54 centimeters) thick that supports the outwardly extending ledge portion 39 of the lower refractory wall member 38 in partially overlapping relation to permit room for thermal expansion between peripheral ledge 48 and ledge portion 39.

The vacuum chamber 33 is formed between the upper metal wall member 37 and the lower refractory wall member 38 and enclosed within the vertical wall portions 46. In order to replace a lower refractory wall member 38 corresponding to one production pattern with one corresponding to another production pattern, the bolts 47 that secure the horizontal flanges of angle irons 45, fixed to one of the vertical wall portions 46 (preferably a longer wall portion if the vertical wall portions define a rectangular shape), to the upper metal wall member 37 are loosened and removed. The loosened lower refractory wall member 38 is removed from the inverted metal box 36 through the opening provided by removing the vertical wall portion 46. In order to facilitate this removal, the ledge portion 39 is slightly narrower and slightly shorter than the circumferential, inwardly extending ledge 48 to provide clearance for its removal and installation, but wider and longer than the area defined by the inner margin of the circumferential, inwardly extending ledge 48 to provide adequate support. After its removal, another lower refractory wall member 38 conforming to the new production pattern but having an essentially identical circumferential, outwardly extending ledge portion 39 as that of the removed lower refractory wall member 38 is inserted within the vacuum chamber to have its outwardly extending ledge portion 39 rest on the ledge 48.

The previously removed vertical wall portion 46 is replaced to close the vacuum chamber 33. To accomplish this, the vertical wall portion 46 and its attached angle irons 45 are placed in the proper position and bolts 47 tightened to fasten the horizontal flange of each angle iron to the upper metal wall member 37. The apparatus is now ready to produce a different pattern after a flexible, air impervious, stretchable tape 55 is applied around the peripheral joint between the lower refractory wall member 38 and the lower surface of the circumferentially extending ledge 48 to provide a peripheral, stretchable gasket means therearound. A typical preferred type of a thermosetting, pressure sensitive adhesive tape is a fiberglass cloth electrical tape that is sold by Minnesota Mining and Manufacturing (3M) under the Scotch #27 trademark in ¼ inch (1.27 centimeters) width. However, usually this flexible adhesive tape gasket is not necessary and its use is optional.

The apertures in the apertured lower wall member 38 are made as small as possible and are spaced as closely as is necessary to assure vacuum support for a hot glass sheet with reasonable energy consumption. For an upper vacuum mold having a glass sheet engaging apertured lower wall member 38 with dimensions 46 inches (117 centimeters) long and 22 inches (56 centimeters) wide, apertures having a diameter of 0.09 inches (0.23 centimeters) and spaced apart from one another 1.5 inches (3.8 centimeters) in a rectangular or diamond pattern have been found to work adequately in handling glass sheets whose weight is up to 20 pounds (9 kilograms). The apertures extend through the entire thickness of the downwardly facing apertured wall member 38.

The cooling station 14 comprises several upper plenum chambers 51, each provided with longitudinally spaced transverse rows of transversely spaced pipe nozzles 52 extending downward to direct air applied under pressure to the upper plenum chambers toward the upper surface of a glass sheet that is aligned with the bottom openings of the nozzles. Opposing each upper plenum chamber 51 is a lower plenum chamber 53 provided with lower bar-type nozzle housing 54 disposed with thick walls extending vertically and having elongated openings directed upward through their thickness so that air blasts applied under pressure to the lower plenum chambers 53 are directed through the elongated openings upward against the lower major surface of the glass sheet. The array of openings of the lower bar-type nozzle housings opposes a corresponding array of openings in the upper pipe nozzles. The bar-type nozzle housings are spaced vertically below the upper pipe nozzles to provide clearance for moving a ring-like member 70 along a path between said upper nozzles and said lower nozzles. The lower ends of the rows of pipes are located along a curved surface complementary to the curved shape of the upper smooth surfaces of the bar-type housings for the lower nozzles to provide a curved clearance space therebetween conforming to the transverse shape of the glass sheets conveyed therebetween. If desired, the plenum chambers 51 and 53 are separated into discrete upper and lower chambers along the length of cooling station 14 to provide different air pressures into the various upper plenum chambers and the lower plenum chambers so as to provide a program of air blasts along the length of the cooling station 14. The illustrated apparatus has three upper and three lower plenum chambers, each subdivided into two sections. The exact numbers may vary, if desired, without departing from the gist of this invention.

The lower bar-type nozzles 54 may be interconnected to a common pivotally mounted frame (not shown). A construction similar to that disclosed and claimed in U.S. Pat. No. 3,846,106 to Samuel L. Seymour for pivoting a lower set of nozzles may be used for pivoting apparatus to rapidly remove cullet by sliding relative to the lower bar-type nozzles 54 of the illustrative embodiment of this invention. The description of this patented construction is incorporated by reference in the present application.

The spaces between the upper pipe nozzles 52 provide paths for the escape of air blasted against the upper concave surface of glass sheets treated by the apparatus described in this specification. The spaces between adjacent lower bar-type nozzle housings 54 provide paths for the escape of air blasted against the lower convex surface of said glass sheets. While more total space is provided for the escape paths above the glass than for the escape paths below the glass, the difference in total space for escape provided on opposite sides of the shaped glass sheets is helpful in providing greater uniformity of cooling of the top and bottom surfaces than would be the case if both upper and lower glass sheet surfaces had escape paths of equal size. This result follows because a convex surface is more streamlined than a concave surface. Therefore, it is more difficult to remove air applied normally against a concave surface than air applied normally against a convex surface and therefore more escape space is provided to remove air blasts that impinge against the upper concave surface than for air blasts that impinge against the lower convex surface.

The ring-like member 70 comprises a rail that extends in the form of a ring-like structure disposed edgewise with its width forming the height of the rail. Connectors 79 are attached at their inner ends to the laterally outer surface of the rail at spaced points therealong and at their outer ends to a reinforcing frame 80. Both the latter and the frame-like member 70 are shaped in outline similar to the outline shape of a supported glass sheet and in elevation similar to the curvature of the supported glass sheet.

The reinforcing frame 80 is preferably constructed of an outer steel pipe similar in outline shape to that of the ring-like member 70 and surrounds the latter in spaced relation thereto. The space between the ring-like member 70 and the reinforcing frame 80 is determined by the length of the connector means 79. A preferred construction for the ring-like member is disclosed in U.S. Pat. No. 3,973,943 to Seymour, the disclosure of which is incorporated herein by reference.

The reinforcing frame 80 is connected to a carriage 96. The carriage 96 is connected to a rack 102 on each side of the carriage 96. The racks 102 are connected to reversible pinions 104, which are actuated by a reversible drive motor (not shown). This arrangement guides the movement of the ring-like member 70 between an upstream position at shaping station 16, a downstream position in alignment with a sheet transfer means (not shown) at the downstream end of the cooling station 14 and an intermediate parking position just downstream of the shaping station. The carriage 96 is reinforced by several arcuate cross braces (not shown) shaped to conform with the transverse curved shape defined by the upper surfaces of the lower bar-type nozzle housings 54 and the lower ends of the rows of upper pipe nozzles 52 so as to be capable of moving therebetween.

The carriage 96, the ring-like member 70 and its reinforcing frame constitute shuttle means for transferring one or more bent glass sheets from the shaping station 16 to the cooling station 14 where the glass is cooled and transferred to an unloading device (not shown). The shuttle means is capable of returning to the shaping station 16 at a suitable moment in the next shaping cycle. During cooling, the carriage is reciprocated to avoid an iridescent pattern in the glass sheet.

An elongated housing 62 extends across the width of the apparatus between the shaping station 16 and the cooling station 14. The roof of the housing 62 tapers upwardly and inwardly to provide a narrow slot extending across the apparatus in a horizontal plane clear of the path taken by the shuttle means 70, 80, 96 when the latter moves between the shaping station 16 and the cooling station 14. Air is supplied continuously to the housing 62 at a relatively low pressure for escape upward through the narrow slot to provide a continuous air curtain that protects the mold parts somewhat from impingement by air blasts from the tempering nozzles that would tend to cause an enhanced temperature gradient along the mold parts in the direction of the path of glass sheet movement in the absence of the continuous air curtain. The air curtain is believed to be superior to a mechanical barrier that must be lifted to protect the mold parts between successive transfer operations and lowered intermittently each time the shuttle means moves through the boundary region downstream of the shaping station 16 and upstream of the cooling station 14.

A Cycle of Operation

At the beginning of a shaping cycle initiated by glass sensing element S sensing the presence of a glass sheet thereover according to the present invention, the glass sheet is conveyed into the glass shaping station 16 on conveyor rolls 18 and 19 with the lower mold disposed in a retracted position with its upward facing shaping surface 22 entirely below the upper support surface provided by the conveyor rolls 19 and the upper vacuum mold 36 having its apertured lower refractory wall member 38 spaced a short distance above the upper surface of the glass sheet. The latter travels until it reaches a position of alignment between the lower mold 34 and the upper vacuum mold 36. When the glass sheet is initially shaped to a cylindrical curve about an axis extending substantially parallel to the direction of glass sheet movement defined by the conveyor rolls 18 and 19, the exact moment that the lower mold 34 is actuated is not as critical as it would be for more complicated bends.

As the glass sheet arrives at the shaping station 16, a timer initiated by sensing element S actuates piston 28 and causes vacuum to be applied to the upper vacuum mold 36 as the lower mold 34 is lifted. The glass sheet is lifted on the lower mold 34 into a position in the vicinity of the upper vacuum mold 36. The latter is initially supported in closely spaced relation (several glass sheet thicknesses) above the upper tangent common to conveyor rolls 19. Since the glass sheet is hot when it arrives at the shaping station, it readily sags by gravity to conform to the relatively sharp curvature of the upwardly facing shaping surface 22 of the shaped lands 23 of the lower mold 34 when the latter lifts the soft glass sheet into a position in close adjacency to the downward facing shaping surface of the lower apertured wall 38 of the upper vacuum mold 32. The glass sheet is lifted into close adjacency to the upper vacuum mold 32 by limiting the extent of upward movement of piston(s) 28, and before the glass sheet is simultaneously engaged between the upward facing surface 22 of the lower mold 34 and the downward facing shaping surface of the upper vacuum mold 36, suction lifts the shaped glass sheet so that the peripheral portion only of the glass is initially brought into engagement with the lower refractory wall member 38 of the upper vacuum mold 32. The shape defined by the downward facing shaping surface of the upper vacuum mold 32 is of a shallower bend than the upward facing shaping surface of the lower mold 32 with the portion of the glass sheet intermediate its end portions initially out of contact with the downward facing shaping surface of the upper vacuum mold 32.

Lower mold 34 has been lifted in response to the sensing element S actuating a timer circuit (not shown) that extends the piston(s) 28 in timed sequence after sensing the passage of the glass sheet over the sensing element S. The timer also controls the onset of the return of the lower shaping mold to its recessed position. The latter timer is timed to insure that the return of the lower mold 34 by retraction of piston(s) 28 is coordinated with the time that the glass sheet is engaged by suction against the lower refractory wall member 38 of the upper vacuum mold 32. The timer also initiates the upward retraction of vertical piston 43 which causes lifting of the upper vacuum mold 32 simultaneously with the downward movement of the lower mold 34. Vacuum is continued as the upper vacuum mold rises so as to cause the upper surface of the glass sheet to conform exactly to the more shallow shape of the lower refractory wall member 38 of the upper vacuum mold 32.

When the upper vacuum mold 32 reaches its upper position, the shaping station is now ready to receive the ring-like member 70 into position between the upper vacuum mold 32 and the lower mold 34. The carriage 96 stops with the ring-like member 70 at its aforesaid upstream position directly below the upper vacuum mold 32. At the same time, when the ring-like member 70 occupies its upstream position immediately below the upper vacuum mold 32, the vacuum in upper vacuum mold 32 is released, thereby permitting the shaped glass sheet to be deposited onto the ring-like member 70.

The shape of the ring-like member transverse to the path of movement, and particularly its transversely extending portion, may have the same curvature or a different curvature from that defined by the downwardly facing shaping surface of the upper vacuum mold 32. When a ring-like member 70 has a shaping surface that is more shallow than that defined by the upper vacuum mold 32, the glass sheet, still soft from its heating in the furnace 12, is dropped so that its center portion initially rests on the center portion of the transversely extending rail portion of the ring-like member and the extremities of the glass sheet initially bent to a sharper curvature are spaced upward from the shaping rail transverse portion. However, before the carriage 96 moves the glass sheet into the cooling station 14, its end portions sag to conform to the remainder of the outline configuration of the shaping rail of the ring-like member 70.

As an alternative, the glass sheet may be dropped onto a ring-like member 70 whose transversely extending rail portion defines a curvature of even sharper radius of bend than that defined by the downward facing shaping surface of the upper vacuum mold. The radius of curvature may even be sharper than that defined by the lower mold 34. Thus, when the glass sheet is dropped on the termination of vacuum, only the side edges of the bent glass sheet will initially rest on the transversely extending rail portion of the ring-like member 70 and the glass will then sag to complete its sharper shape in conformance with the upper edge of the transversely extending rail portion of the ring-like member 70.

The glass sheet supported on the ring-like member 70 is transferred to the cooling station 14 where air under pressure is applied through the downward facing nozzles 52 extending from the upper plenum chambers 51 and through the orifices of the lower bar-type nozzles 54 extending upward from the lower plenum chambers 53 to cool the glass as rapidly as possible to impart at least a partial temper thereto.

The ring-like member 70 transports the bent glass sheet through the cooling station 14. When it arrives at its most downstream position at the downstream end of the cooling station 14, the reversible pinions 104 stop rotating. At this time, a glass sheet transfer device (not shown) has begun to transfer the glass sheet from the ring-like member 70 toward an unloading conveyor (not shown). At a proper time, the timer controls the onset of the reverse rotation of the reversible pinions 104 that control the return movement of the racks 102 and their attached ring-like member 70 in an upstream direction to either a parking position immediately downstream of the shaping station or directly into the shaping station.

The need for imparting vertical reciprocating movement to the upper mold 36 and the lower mold 34 during the operating cycle makes it desirable to use a refractory material free of localized regions of high stress whereever possible. The present invention has developed vacuum molds of greater durability than the prior art by eliminating localized regions of metal to refractory composition engagement such as exist when metal clamping devices are used to secure the refractory bottom wall member to the upper inverted metal box. The mere resting of the overlapping outwardly extending ledge portion 39 on the inwardly extending ledge 48, as suggested by the present invention, provides adequate support for the lower ledge portions 39 on the ledge 48 without developing local stresses that lead to early breakage. Thus, every time the vacuum mold 32 is moved vertically during a glass sheet shaping operation, the lower refractory wall member 38 has a lifting or lowering force applied throughout the extent of the extended area that its outwardly extending ledge portion 39 overlaps inwardly extending ledge 48. When the force is applied over such an extended area instead of being concentrated in small areas of clamping, stresses are lessened considerably.

As a practical matter, refractory compositions have been used successfully for the lower refractory wall member having a specific gravity less than 4 (preferably less than 3), a thermal coefficient of expansion between 0° C. and 500° C. that does not exceed $5 \times 10^{-5}$ per degree Celsius, and a heat transfer coefficient less than $5 \times 10^{-4}$ calories per second per centimeter per degree Celsius, and preferably less than $2 \times 10^{-4}$ calories per second per centimeter per degree Celsius. These include a material consisting essentially of 70 percent by weight of Portland cement containing calcium silicates, calcium aluminates and calcium ferrites and 30 percent by weight of calcium magnesium silicate fiber. This material is sold by Johns-Manville under the trademark TRANSITE®.

Another refractory composition that would be practical for use in vacuum molds to produce parts that are required in low to medium volumes, such as replacement windows rather than original equipment windows, is a refractory composition containing 95 percent by weight of ground calcium carbonate and diatomaceous earth and 5 percent by weight of craft which is sold under the registered trademark of MARINITE® by Johns-Manville.

The form of the invention shown and described in this disclosure represents an illustrative preferred embodiment and various modifications thereof. It is understood that various changes may be made without departing from the gist of the invention except insofar as defined in the claimed subject matter that follows.

What is claimed is:

1. An apparatus for shaping glass sheets comprising:
an upper box with an upper plate member, wall members and rigid edges extending inwardly from said wall members to provide said box with a peripheral supporting ledge;
a lower refractory wall member having a lower shaping surface defining a desired glass sheet shape and an outwardly extending peripheral ledge overlapping and resting on said peripheral supporting ledge of said upper box, said lower refractory wall member being apertured therethrough connecting said lower shaping surface with a chamber defined by said lower refractory wall member and said upper box, wherein corresponding supporting ledge portions of said upper box and extending peripheral ledge portions of said lower refractory wall member are sized to terminate said outwardly extending peripheral ledges in spaced relation to adjacent portions of said wall member in said inwardly extending peripheral supporting ledges in spaced relation to adjacent portions of said lower refractory wall member to provide a non-fixed support of said lower refractory wall by said upper box and accommodate thermal expansion of said upper box without affecting said lower refractory wall member;
means to seal said upper box with said lower refractory wall member; and
means adapted to connect said chamber to a vacuum source.

2. Apparatus as in claim 1, further characterized by said upper box including a readily removable and attachable wall member to which a substantially coextensive portion of said peripheral supporting ledge of said upper box is attached, removal of said wall member providing an access opening to enable the removal of one lower refractory wall member having a lower shaping surface defining one production pattern and the substitution therefor of another lower refractory wall member having an outwardly extending peripheral ledge of substantially the same dimensions as the outwardly extending peripheral ledge of said one lower refractory wall member and a lower shaping surface that conforms to a different production pattern.

3. Apparatus as in claim 2, wherein said sealing means includes readily applicable and readily removable peripheral gasket means applied to the lower joint between said upper box and said lower refractory wall member.

4. Apparatus as in claim 1, further including a lifting mold disposed below said lower refractory wall member and means adapted to lift said lifting mold supporting thereon a glass sheet into close adjacency to said lower apertured refractory wall member to enable a vacuum within said chamber applied through the apertures of said lower apertured refractory wall member to engage said lifted glass sheet against said lower shaping surface.

5. Apparatus as in claim 4, further including a heating furnace and a glass sheet conveying means for conveying said glass sheet from said furnace to a shaping position downstream of said furnace at said shaping station between said lifting mold and said lower refractory wall member.

6. Apparatus as in claim 5, further including a cooling station located downstream of said shaping station, a ring-like member, means to shuttle said ring-like member between said shaping station and said cooling station, and means to coordinate the relative movement of said conveyor means, said apertured lower refractory wall member, said lifting mold and said ring-like member to position said apertured lower refractory wall member and said lifting mold on opposite sides of said conveyor means and to cause said ring-like member to be downstream of said shaping station when said conveyor means delivers said glass sheet to said shaping position at said shaping station, to lift said lifting mold with said glass sheet thereon above said conveyor means to the vicinity of said apertured lower refractory wall member, to apply vacuum via said chamber and the apertures of said apertured, lower refractory wall member to engage said glass sheet by vacuum thereagainst, to continue to apply said vacuum while lowering said lifting mold below said conveyor means and to shuttle said ring-like member in an upstream direction to a position aligned vertically between said apertured lower refractory wall member and said lowered lifting mold when said lifting mold is lowered below said conveying means, to release said chamber from vacuum to deposit said glass sheet onto said ring-like member, to shuttle said ring-like member in a downstream direction toward said cooling station, and to apply cold tempering medium toward the opposite major surfaces of said glass sheet deposited onto said ring-like member at a rate sufficient to impart a desired degree of temper.

7. Apparatus as in claim 6, further including an elongated housing extending across the width of said apparatus between said shaping station and said cooling station, said housing having narrow slot means extending across the apparatus in a plane clear of the path taken by said ring-like member when the latter shuttles between said shaping station and said cooling station, and means to supply relatively cold air continuously to said housing for escape through said narrow slot means to provide a continuous air curtain between said shaping station and said cooling station.

8. A sheet shaping mold comprising:
an upper section having an upper plate member and sidewalls;
an apertured lower section having a lower sheet shaping surface, said apertures extending through said lower section to connect said lower sheet shaping surface with a chamber formed by said upper section and said lower section;
means for engaging said upper section with said lower section to provide a non-fixed support of said lower section to said upper section to permit free and unhindered thermal expansion of said upper section and lower section relative to each other;
means to seal said upper section with said lower section; and
means adapted to connect said chamber a vacuum source.

9. A shaping mold as in claim 8, wherein said engaging means includes a peripheral ledge extending from said lower section and a peripheral supporting ledge extending from said sidewalls such that said peripheral ledge of said lower section is supported by said peripheral supporting of said upper section, said ledges sized to provide a space between adjacent portions of said sidewalls, said lower section and said ledges.

10. A shaping mold as in claim 9, wherein said peripheral supporting ledge is an outwardly extending peripheral supporting ledge and said peripheral ledge of said lower section is an inwardly extending peripheral ledge.

11. A shaping mold as in claim 9, wherein said peripheral supporting ledge is an inwardly extending peripheral supporting ledge and said peripheral ledge of said lower section is an outwardly extending peripheral ledge.

* * * * *